United States Patent [19]
Nakano

[11] Patent Number: 6,097,444
[45] Date of Patent: Aug. 1, 2000

[54] AUTOMATIC IMAGE QUALITY ADJUSTMENT DEVICE ADJUSTING PHASE OF SAMPLING CLOCK FOR ANALOG VIDEO SIGNAL TO DIGITAL VIDEO SIGNAL CONVERSION

[75] Inventor: Takao Nakano, Tokyo, Japan

[73] Assignee: Mitsubishi Denki Kabushiki Kaisha, Tokyo, Japan

[21] Appl. No.: 09/245,416

[22] Filed: Feb. 5, 1999

[30] Foreign Application Priority Data

Sep. 11, 1998 [JP] Japan ................................. 10-257946

[51] Int. Cl.$^7$ ...................................................... H04N 5/21
[52] U.S. Cl. ......................... 348/607; 348/625; 348/572; 348/537
[58] Field of Search ..................................... 348/607, 625, 348/606, 536, 537, 624, 630, 654, 678, 572; H04N 5/21

[56] References Cited

U.S. PATENT DOCUMENTS 5,978,041 11/1999 Masuda .................................... 348/678
5,990,968 11/1999 Naka ....................................... 348/537

FOREIGN PATENT DOCUMENTS

1-163070 6/1989 Japan .
7-219485 8/1995 Japan .

*Primary Examiner*—Sherrie Hsia

[57] ABSTRACT

An MPU changes the phase of a sampling clock signal by one step for each frame until the change in the phase reaches 360 degrees. An image quality detector portion sequentially receives a digital image signal to detect a maximum one of data about the absolute value of a difference between adjacent pixels in one frame as an image quality judgement data signal. The MPU detects a maximum one of all image quality judgement data to determine a phase at that time as an optimum phase of the sampling clock signal. The MPU then periodically checks image quality on a screen, and makes a real-time correction to the phase of the sampling clock signal if a temperature drift or the like occurs.

15 Claims, 7 Drawing Sheets

FIG. 3A
CLOCK FOR PC

FIG. 3B
PC OUTPUT VIDEO SIGNAL

FIG. 3C
SAMPLING CLOCK FOR
SIGNAL RECEIVER    OPTIMUM PHASE

FIG. 3D
SAMPLING CLOCK FOR
SIGNAL RECEIVER    IMPROPER PHASE

AUTOMATIC IMAGE QUALITY ADJUSTMENT DEVICE ADJUSTING PHASE OF SAMPLING CLOCK FOR ANALOG VIDEO SIGNAL TO DIGITAL VIDEO SIGNAL CONVERSION

BACKGROUND OF THE INVENTION

1. Field of the Invention

The present invention relates to a display device for converting an analog video signal outputted from a personal computer or a workstation into a digital video signal to display the digital video signal. More particularly, the invention relates to a technique for automatically adjusting image quality on a screen to an optimum level. The technique of the present invention is satisfactorily applicable to flat display devices capable of displaying a digital image which are represented, for example, by a liquid crystal display device and a plasma display device.

2. Description of the Background Art

Figure 9:
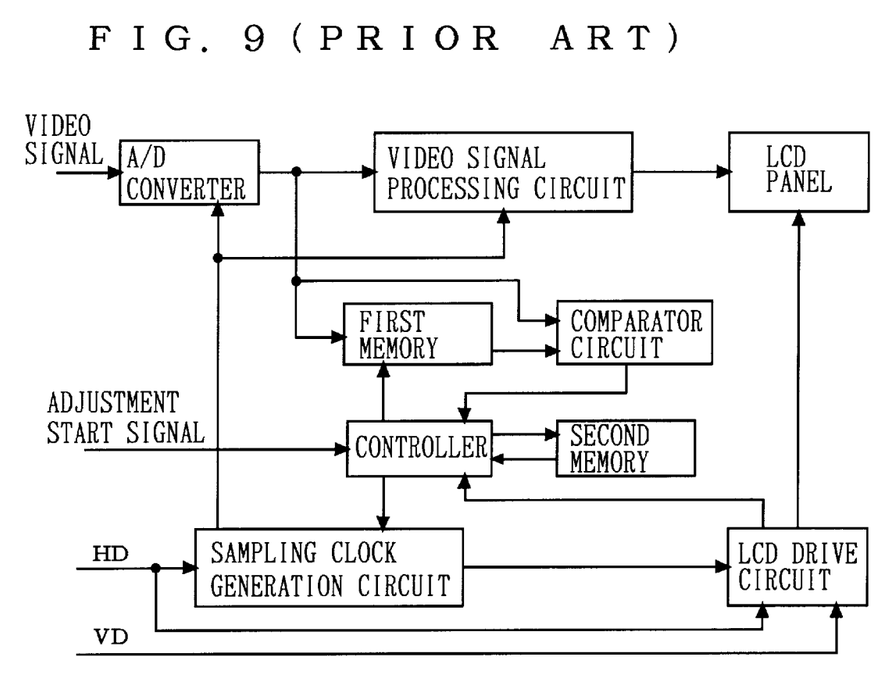
FIG. 9 is a block diagram of a prior art liquid crystal display device.

FIG. 9 is a block diagram of a prior art liquid crystal display device disclosed in Japanese Patent Application Laid-Open No. P07-219485A (1995). The device of FIG. 9 samples an output video signal from a personal computer and the like to display an image on a liquid crystal display panel. The operation of the device is described below.

Referring to FIG. 9, pixel data for at least a predetermined part within a first frame are sampled at a fixed phase and then stored in a first memory. A frame which appears n frames later than the first frame is defined as a second frame. Pixel data for the same part within the second frame as within the first frame are sampled at the abovementioned phase. A comparator circuit compares the sampled pixel data with the pixel data of the first frame to judge whether or not both of the pixel data substantially coincide with each other for each horizontal scanning line. A controller counts the number of horizontal scanning lines in which the substantial coincidence is detected, based on the result of comparison outputted from the comparator circuit. The controller repeats the above described processing, with the sampling phase varied, to store the count and the sampling phase at that time in a second memory for each cycle of the processing. The controller compares the results stored in the second memory to extract a sampling phase at the time of the greatest number of horizontal scanning lines in which the pixel data for the predetermined part after the n frames substantially coincide with the pixel data for the predetermined part within the first frame. Then, the controller uses the extracted sampling phase as an optimum phase of a sampling clock to display a video signal. This allows the sampling phase to be automatically set near the center of pixels to execute appropriate sampling.

Unfortunately, the prior art liquid crystal display device is required to manually adjust a video signal capturing position prior to the judgement of the phase coincidence.

Additionally, the prior art liquid crystal display device adopts a scheme for comparing the pixel data for the predetermined part of a given frame with the pixel data corresponding to the predetermined part after the n frames as a means for judging the phase coincidence. This scheme finds difficulties in detecting the optimum phase if noises are superimposed on an input video signal or if the personal computer provides unstable outputs.

Further, the prior art liquid crystal display device which gives no consideration to periodical automatic adjustment is not capable of coping with changes, if any, in the phase of the sampling clock due to a temperature drift in the personal computer or in a sampling clock generating circuit of the device. Even when the prior art liquid crystal display device periodically makes an automatic adjustment, the sampling phase is changed every n frames during the phase adjustment so far as the above described scheme is employed. This is disadvantageous in that normal pictures are not outputted on the screen during the adjustment.

The prior art liquid crystal display device presents another problem in that the use of n-frame video data for each measurement of the number of scanning lines requires much processing time to make a final judgement.

Such problems are not unique to the liquid crystal display device illustrated in FIG. 9 but are encountered also by other devices which employ a similar scheme to convert an analog video signal into a digital video signal to display a digital image.

SUMMARY OF THE INVENTION

According to a first aspect of the present invention, a device for automatically adjusting image quality comprises: (a) frequency optimizing means for generating a frequency control signal for setting a frequency of a sampling clock signal synchronous with a synchronizing signal provided from the exterior; (b) phase optimizing means for generating a phase control signal for setting a phase of the sampling clock signal; (c) clock producing means receiving the synchronizing signal, the frequency control signal and the phase control signal for generating the sampling clock signal having the frequency determined by the frequency control signal and the phase determined by the phase control signal and synchronous with the synchronizing signal; (d) converting means receiving an analog video signal and the sampling clock signal for sampling and holding the analog video signal using timing of the sampling clock signal to convert the analog video signal into a digital video signal; (e) image quality detecting means receiving the digital video signal for detecting the quality of one picture indicated by the digital video signal to generate an image quality judgement data signal; and (f) storing means for storing the image quality judgement data signal outputted from the image quality detecting means and phase data indicative of the phase of the sampling clock signal associated with the image quality judgement data signal, the phase optimizing means comprising (b-1) phase control signal changing means for sequentially changing the phase indicated by the phase control signal by a predetermined amount of phase change from its initial value within a phase change range corresponding to one cycle of the sampling clock signal each time the storing means stores the image quality judgement data signal for the one picture and the phase data associated therewith, and (b-2) optimum phase determining means for extracting a maximum one of a group of data containing the image quality judgement data signal for the one picture stored in the storing means before the amount of change in the phase of the sampling clock signal reaches the phase change range to determine the phase of the sampling clock signal associated with the maximum one as an optimum phase and to finally determine an optimum phase control signal indicative of the optimum phase as the phase control signal.

Preferably, according to a second aspect of the present invention, in the device of the first aspect, the image quality detecting means generates the image quality judgement data signal, based on data about the absolute value of a difference between data about adjacent pixels in the one picture.

Preferably, according to a third aspect of the present invention, in the device of the second aspect, the image quality detecting means determines a data signal indicative of a maximum one of the data about the absolute value of the difference over the entire area of the one picture as the image quality judgement data signal.

Preferably, according to a fourth aspect of the present invention, in the device of the second aspect, the image quality detecting means detects an average of all of the data about the absolute value of the difference within a predetermined area in the one picture to determine a data signal indicative of the average as the image quality judgement data signal.

Preferably, according to a fifth aspect of the present invention, in the device of the fourth aspect, the predetermined area in the one picture corresponds to the entire area of the one picture.

Preferably, according to a sixth aspect of the present invention, in the device of the second aspect, the image quality detecting means detects a moving-average of all of the data about the absolute value of the difference within a predetermined area in the one picture to determine a data signal indicative of the moving-average as the image quality judgement data signal.

Preferably, according to a seventh aspect of the present invention, in the device of the second aspect, the image quality detecting means determines as the image quality judgement data signal a data signal indicative of an average of some selected data which have decreasing magnitudes starting with the greatest among the data about the absolute value of the difference over the entire area of the one picture.

Preferably, according to an eighth aspect of the present invention, the device of the first aspect further comprises: (g) timer means for judging whether or not a predetermined time for periodical check has been elapsed since the determination of the optimum phase; and (h) periodical phase correction means for generating and outputting first and second periodical check phase control signals as the phase control signal to read from the storing means the image quality judgment data signal consequently outputted from the image quality detecting means to determine a new optimum phase based on a read image quality judgement data signal when the timer means judges that the predetermined time for periodical check has been elapsed, the first and second periodical check phase control signals indicating phases changed from the optimum phase by the predetermined amount of phase change in positive and negative directions, respectively.

Preferably, according to the ninth aspect of the present invention, in the device of the first aspect, when the one picture is divided into a plurality of blocks, the phase control signal changing means comprises (b-1-1) means provided for a respective associated one of the plurality of blocks, the means for sequentially generating and outputting the phase control signal which gives an instruction so that the associated block differs in the initial value from other blocks to sequentially change the phase for the associated block indicated by the phase control signal by the predetermined amount of phase change from the initial value for the associated block. The sum of the amounts of phase change for the plurality of blocks corresponds to the phase change range. The image quality detecting means detects the image quality for each of the plurality of blocks for the one picture to generate and output a detection result as the image quality judgement data signal.

Preferably, according to a tenth aspect of the present invention, in the device of the second aspect, the frequency optimizing means comprises: (a-1) synchronizing signal detecting means receiving the synchronizing signal for detecting a frequency and a polarity of the synchronizing signal to output a detection result as a synchronizing signal judgement data signal; (a-2) image start and end detecting means receiving the digital video signal for detecting a start point and an end point in displaying digital video data for the one picture indicated by the digital video signal to output a detection result as an image start and end judgement data signal; (a-3) timing data storing means for storing standard video signal timing data therein; and (a-4) frequency control signal generating means for determining the frequency of the sampling clock signal from the standard video signal timing data read from the timing data storing means, based on the synchronizing signal judgement data signal and the image start and end judgment data signal, to output a signal which gives an instruction for a determined frequency as the frequency control signal.

Preferably, according to an eleventh aspect of the present invention, in the device of the second aspect, the frequency optimizing means comprises: (a-1) means for setting a suitable initial value to the frequency of the sampling clock signal to output a first temporary frequency control signal which gives an instruction for the suitable initial value to the clock producing means; (a-2) means for outputting a temporary phase control signal which gives an instruction for the initial value of the phase of the sampling clock signal to the clock producing means; and (a-3) means receiving the digital video signal outputted form the converting means in response to the first temporary frequency control signal outputted from the means (a-1) and the temporary phase control signal outputted from the means (a-2) for detecting a change in amplitude of difference data for one horizontal line in a digital image indicated by the digital video signal to store first cycle data about the amplitude change, the means (a-3) then changing the suitable initial value set by the means (a-1) by a predetermined value to output a second temporary frequency control signal indicative of a new value resulting from the change to store second cycle data about the amplitude change of the difference data for the one horizontal line obtained at that time, the means (a-3) making a comparison between the first cycle data and the second cycle data to further change the new value by a value determined depending on a result of the comparison, the means (a-3) continuing sequentially changing the value of the frequency of the sampling clock signal until the cycle of the amplitude change of the difference data for the one horizontal line is absent, the means (a-3) determining a value of the frequency of the sampling clock signal in the absence of the cycle as an optimum value to finally generating a signal indicative of the optimum value as the frequency control signal.

According to a twelfth aspect of the present invention, a display device comprises: the device for automatically adjusting image quality as recited in the first aspect; and a display portion for displaying a digital image indicated by the digital video signal outputted from the converting means which converts the analog video signal thereto based on the sampling clock signal having the optimum phase.

According to a thirteenth aspect of the present invention, an automatic image quality adjustment device comprises: a first input signal line receiving an analog video signal provided from the exterior; a second input signal line receiving a synchronizing signal provided from the exterior; a frequency optimization circuit portion configured to generate a frequency control signal for setting a frequency of a sampling clock signal synchronous with the synchronizing signal; a phase optimization circuit portion configured to generate a phase control signal for setting a phase of the sampling clock signal; a clock production circuit portion connected to the second input signal line, an output of the frequency optimization circuit portion and an output of the phase optimization circuit portion for generating the sampling clock signal having the frequency determined by the frequency control signal and the phase determined by the phase control signal and synchronous with the synchronizing signal; an analog-digital conversion circuit portion connected to the first input signal line and an output of the clock production circuit portion for sampling and holding the analog video signal using timing of the sampling clock signal to convert the analog video signal into a digital video signal; an image quality detection portion connected to an output of the analog-digital conversion circuit portion and configured to detect the quality of one picture indicated by the digital video signal to generate an image quality judgement data signal; and a storage portion configured to store the image quality judgement data signal outputted from the image quality detection portion and phase data indicative of the phase of the sampling clock signal associated with the image quality judgement data signal, the phase optimization circuit portion comprising a phase control signal change portion configured to sequentially change the phase indicated by the phase control signal by a predetermined amount of phase change from its initial value within a phase change range corresponding to one cycle of the sampling clock signal each time the storage portion stores the image quality judgement data signal for the one picture and the phase data associated therewith, and an optimum phase determination portion configured to extract a maximum one of a group of data containing the image quality judgement data signal for the one picture stored in the storage portion before the amount of change in the phase of the sampling clock signal reaches the phase change range to determine the phase of the sampling clock signal associated with the maximum one as an optimum phase and to finally determine an optimum phase control signal indicative of the optimum phase as the phase control signal.

Preferably, according to a fourteenth aspect of the present invention, the device of the thirteenth aspect further comprises: a timer configured to judge whether or not a predetermined time for periodical check has been elapsed since the determination of the optimum phase; and a periodical phase correction portion configured to generate and output first and second periodical check phase control signals as the phase control signal to read from the storage portion the image quality judgment data signal consequently outputted from the image quality detection portion to determine a new optimum phase based on a read image quality judgement data signal when the timer judges that the predetermined time for periodical check has been elapsed, the first and second periodical check phase control signals indicating phases changed from the optimum phase by the predetermined amount of phase change in positive and negative directions, respectively.

Preferably, according to a fifteenth aspect of the present invention, in the device of the thirteenth aspect, when the one picture is divided into a plurality of blocks, the phase control signal change portion comprises a circuit portion configured for a respective associated one of the plurality of blocks, the circuit portion sequentially generating and outputting the phase control signal which gives an instruction so that the associated block differs in the initial value from other blocks to sequentially change the phase for the associated block indicated by the phase control signal by the predetermined amount of phase change from the initial value for the associated block. The sum of the amounts of phase change for the plurality of blocks corresponds to the phase change range. The image quality detection portion detects the image quality for each of the plurality of blocks for the one picture to generate and output a detection result as the image quality judgement data signal.

In accordance with the first, second, twelfth and thirteenth aspects of the present invention, the image quality on a screen can be automatically optimized at high speeds.

In accordance with the third aspect of the present invention, the maximum one of the data about the absolute value of the difference is used as the image quality judgement data for one picture. Therefore, the device of the third aspect can increase the sensitivity with which the data about the absolute value of the difference are detected, to judge the image quality with high precision.

In accordance with the fourth, fifth, sixth and seventh aspects of the present invention, if noises are superimposed on the analog video signal, the image quality can be correctly optimized, with the influence of the noises suppressed.

In accordance with the eighth and fourteenth aspects of the present invention, image data for three pictures are used to automatically periodically adjust the phase of the sampling clock signal. Therefore, the device of the eighth and fourteenth aspects can make a proper real-time correction to deterioration of the image quality with time due to a temperature drift and the like at such a high speed that the execution of the phase correction is not discernible with human eyes, thereby constantly maintaining the image quality at an optimum level.

The device in accordance with the ninth and fifteenth aspects of the present invention can obtain a plurality of image judgement data at one time by the processing of one picture, to accomplish the optimization of the image quality at higher speeds.

It is therefore an object of the present invention to automatically make an image quality adjustment more rapidly than does a conventional device without the need for operator's manual image quality adjustment.

It is another object of the present invention to make a high-precision image quality adjustment without being affected by a phase shift of a clock due to a temperature drift and also without deteriorating image quality on a screen during automatic adjustment.

These and other objects, features, aspects and advantages of the present invention will become more apparent from the following detailed description of the present invention when taken in conjunction with the accompanying drawings.

DESCRIPTION OF THE PREFERRED EMBODIMENTS (First Preferred Embodiment)

Figure 1:
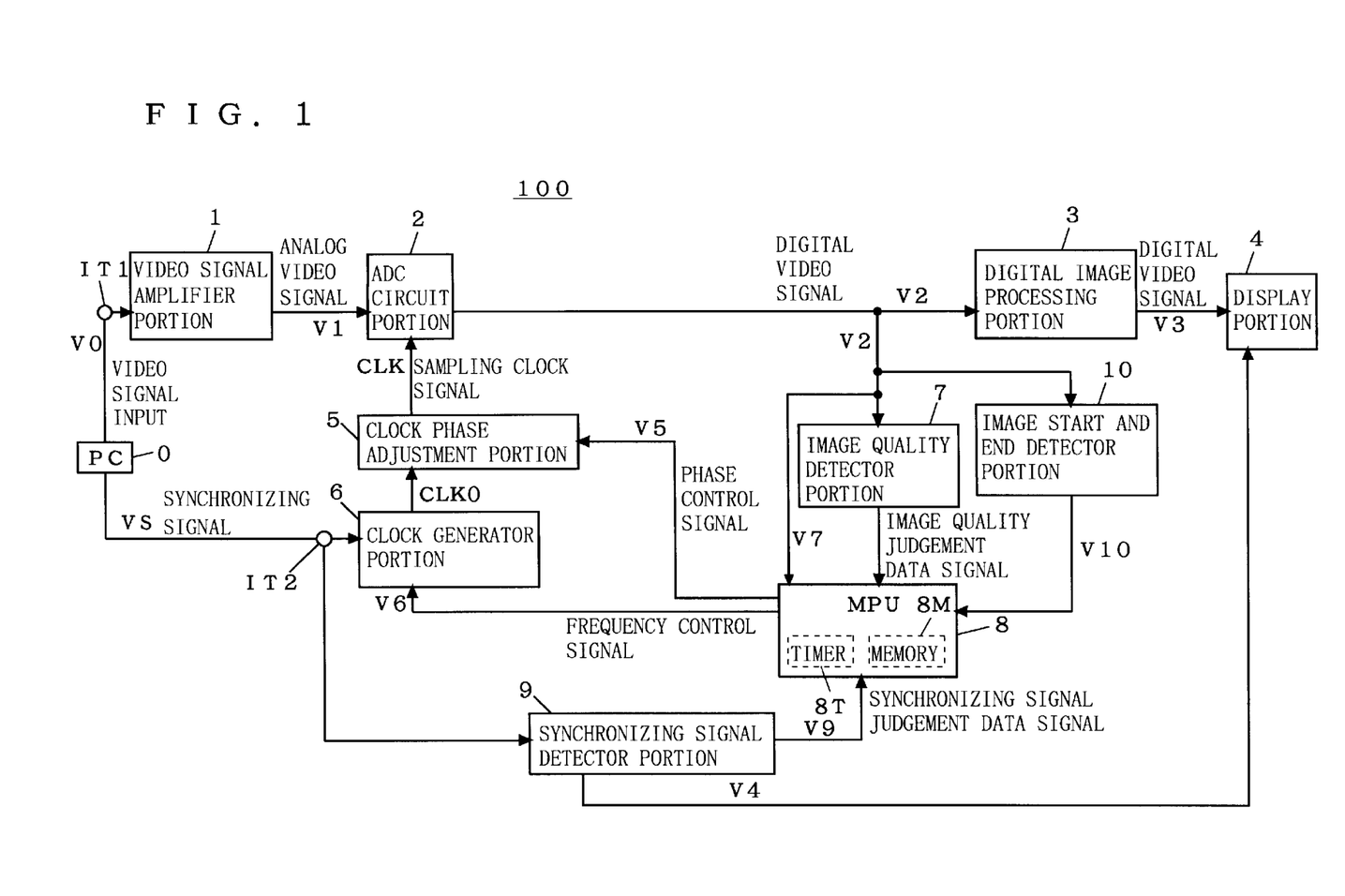
FIG. 1 is a block diagram of a display device according to the present invention.

FIG. 1 is a block diagram of a display device according to the present invention. In FIG. 1, elements 2, and 5 to 10 to be described later correspond to an automatic image quality adjustment device.

In FIG. 1, the reference numeral 0 designates an external personal computer (referred to hereinafter as a PC) which D-A converts a digital video signal into an analog video signal V0 and then outputs the signal V0 and a synchronizing signal VS to the display device 100 of the present invention. The device 100 receives the signals V0 and VS from the exterior at its first and second input terminals IT1 and IT2, respectively. The reference numeral 1 designates a video signal amplifier portion for amplifying the analog video signal V0 to a level optimum for input to an ADC circuit portion 2 to be described below; and 2 designates an analog-digital converter (referred to hereinafter as an ADC circuit portion) for converting an analog video signal V1 into a digital video signal V2. Specifically, the ADC circuit portion 2 is a converter for sampling and holding the analog video signal V1 on the rising edge (or falling edge) of a sampling clock signal CLK generated in the device 100 to convert a sampled and held one-pixel video signal into a digital value. The reference numeral 3 designates a digital image processing portion for performing scaling, gamma correction and the like on a digital image; 4 designates a display portion including a flat display panel device, e.g. a liquid crystal display device, a plasma display panel device and a field emission display (FED) device, for displaying the digital image; 6 designates a clock generator portion for generating a sampling clock signal CLK0 synchronous with a horizontal synchronizing signal in the synchronizing signal VS and having a given frequency and a given initial phase; and 5 designates a clock phase adjustment portion which can arbitrarily change the phase of the sampling clock signal CLK0 generated in and outputted from the clock generator portion 6 relative to the horizontal synchronizing signal. The portions 5 and 6 constitute a clock production portion that receives a frequency control signal V6 and a phase control signal V5 which are generated in and outputted from an MPU 8 to be described later and the synchronizing signal VS to produce the sampling clock signal CLK synchronous with the synchronizing signal VS and having a frequency indicated by the signal V5 and a phase indicated by the signal V5. The portions 5 and 6 are integrated as an IC. The reference numeral 7 designates an image quality detector portion which receives the digital video signal V2 to detect the quality of one picture indicated by the signal V2 (the image quality of all pixel data within one frame) to generate image quality judgement data for judgement of the quality of the picture. Specifically, the portion 7 generates an image quality judgement data signal V7 based on data about the absolute value of a difference between a pixel and its adjacent pixel which are included in one picture. In particular, the image quality judgement data signal V7 used herein is a data signal indicative of a maximum one of the data about the absolute values of such differences determined over the full range of one picture. Thus, the portion 7 detects the maximum absolute value of the difference between data about horizontally adjacent pixels among digital video data. The portion 7 comprises a differential amplifier and a register which are integrated as an ASIC. The reference numeral 8 designates an MPU (microcomputer) for controlling the entire circuit operations of the device 100, such as setting of initial values in the respective elements of the device 100, detection and judgement of a frequency and a phase, and position alignment on the screen of the display portion 1. The MPU 8 comprises a memory 8M for storing data indicated by various signals V2, V5 to V7, V9 and V10. In particular, the MPU 8 functions as: (1) a frequency optimization portion for generating and outputting the frequency control signal V6 for setting the frequency of the sampling clock signal CLK0 based on the signals V9 and V10; (2) a storage portion (corresponding to part of the memory 8M) for storing the image quality judgement data outputted for each frame from the image quality detector portion 7 and phase data indicative of the phase of the sampling clock signal CLK at that time; and (3) a phase optimization portion for generating and outputting the phase control signal V5 for setting the phase of the sampling clock signal CLK by sequentially changing the phase of the sampling clock signal CLK by one step corresponding to a predetermined phase change amount over a range corresponding to one cycle of the signal CLK from its initial value, and then for extracting a maximum one of a group of data including the resultant image quality judgement data to determine the phase of the sampling clock signal CLK corresponding to the maximum data as an optimum phase of the signal CLK. In this term, the MPU 8 implements the function as the nucleus of the present invention. The MPU 8 further comprises a timer 8T. The phase is periodically checked and adjusted as will be described later at predetermined time intervals measured by the timer 8T.

Figure 2:
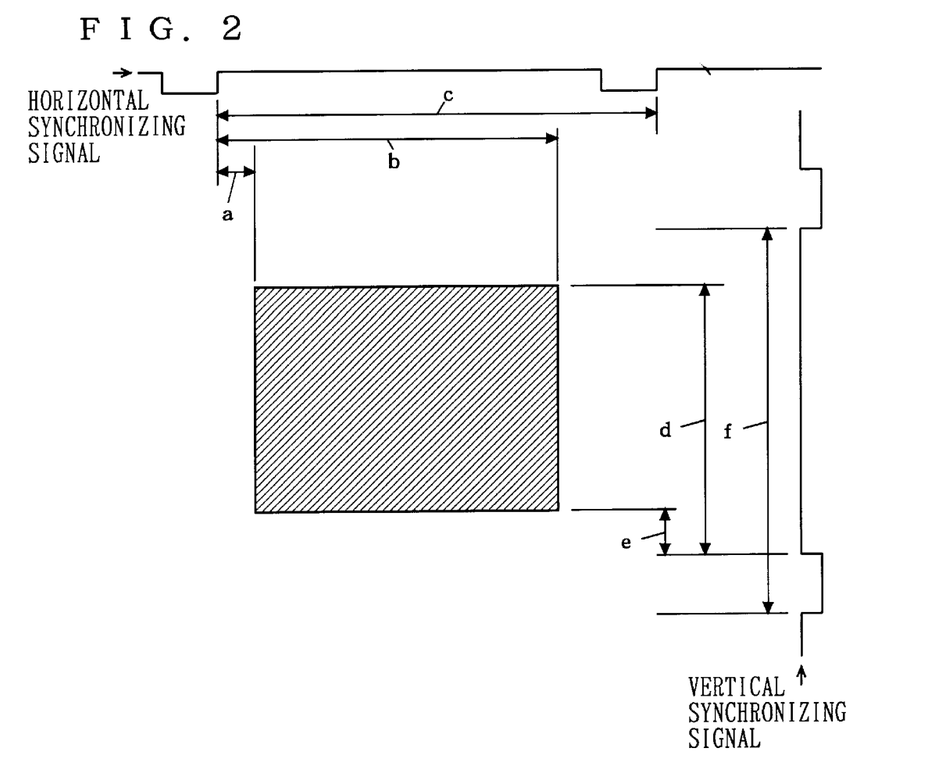
FIG. 2 is a timing chart for illustrating the principle of phase adjustment according to the present invention.

The reference numeral 9 designates a synchronizing signal detector portion for detecting the presence or absence of the synchronizing signal (horizontal and vertical synchronizing signals) VS and the frequency and phase thereof (See the reference characters c and f of FIG. 2). More specifically, the synchronizing signal detector portion 9 measures the frequency (the reciprocal of time designated by the reference character c of FIG. 2) of the synchronizing signal VS and judges the polarity thereof. The polarity is judged as negative when the time period for which the synchronizing signal VS is high makes up not less than 50% of one cycle, and is judged as positive when it makes up less than 50%. The portion 9 itself is a known circuit integrated as an IC.

The reference numeral 10 designates an image start and end detector portion for detecting start and end points (See the reference characters a, b, d and e of FIG. 2) in displaying one-frame digital video data indicated by the digital video signal V2. The portion 10 is a known circuit which is often used as a digital processing circuit for video signals, and is integrated as an IC. Specifically, the portion 10 comprises: (1) a portion for measuring the lengths of the horizontal and vertical synchronizing signals designated by the reference characters a to f of FIG. 2 in the form of counts of a clock in an internal oscillator which oscillates at a fixed frequency; and (2) a level comparator circuit.

The display device 100 according to the present invention is characterized by automatically optimizing the phase of the sampling clock signal CLK (sampling clock phase) used in converting the input analog video signal V0 into the digital video signal V2 to optimize the image quality on the screen. Description will now be given on the principle of the operation of optimizing the phase, based on which the present invention is intended to improve the image quality on the screen, with reference to the timing chart of FIGS. 3A through 3D.

Figure 3A:
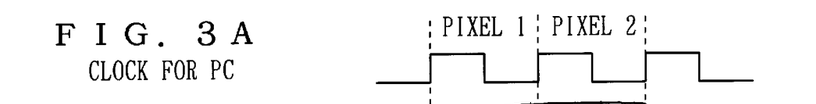
FIGS. 3A through 3D show video detection timing in the display device according to the present invention.
Figure 3B:
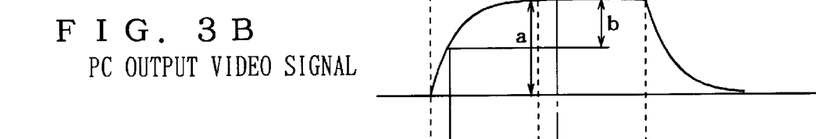
Figure 3C:
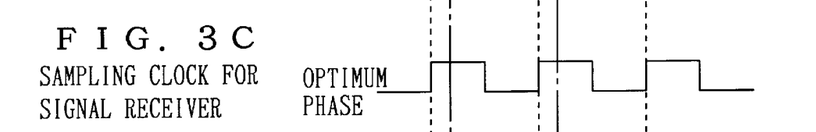
Figure 3D:
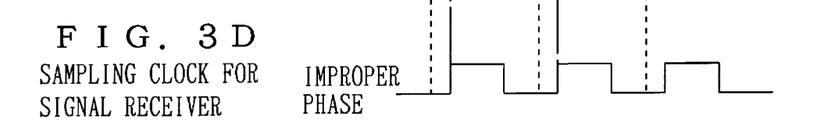

Referring to FIG. 3B, the analog video signal V0 outputted from the PC 0 of FIG. 1 starts changing in level at a point of change in an operating clock (FIG. 3A) for a DAC circuit included in the PC 0 for converting the digital video signal into the analog video signal. The rate of change in time constant at this time is determined by a wiring capacitance between the PC 0 and the first input terminal IT1 of the display device 100, and the like. When the sampling clock signal CLK for a video signal receiver has an optimum phase (FIG. 3C), the difference data, designated by the reference character a, between adjacent pixels is relatively large, as shown in FIG. 3B. On the other hand, when the sampling clock signal CLK has an improper phase (FIG. 3D), the difference data, designated by the reference character b, therebetween is relatively small. The video data with a greater change between adjacent data (data about pixels 1 and 2 of FIG. 3A) exhibit such a difference between the difference data a and b more explicitly. Thus, the use of the data about the maximum absolute value of the difference increases a detection precision.

With the foregoing in mind, the display device 100 according to the present invention is adapted to determine a maximum one of the absolute values of the differences between data about adjacent pixels within each frame (for each picture) as the image quality judgement data, to extract a maximum one of such a group of maximum difference data, thereby determining a phase at the time that the extracted maximum value is used as the image quality judgement data as the optimum phase of the sampling clock CLK to be finally set.

Figure 4A:
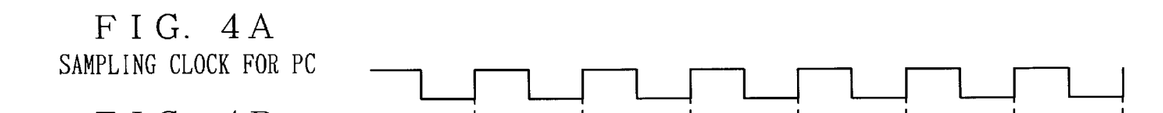
FIGS. 4A through 4G are a timing chart showing the operation of the display device according to the present invention.
Figures 4B, 4C, 4D:
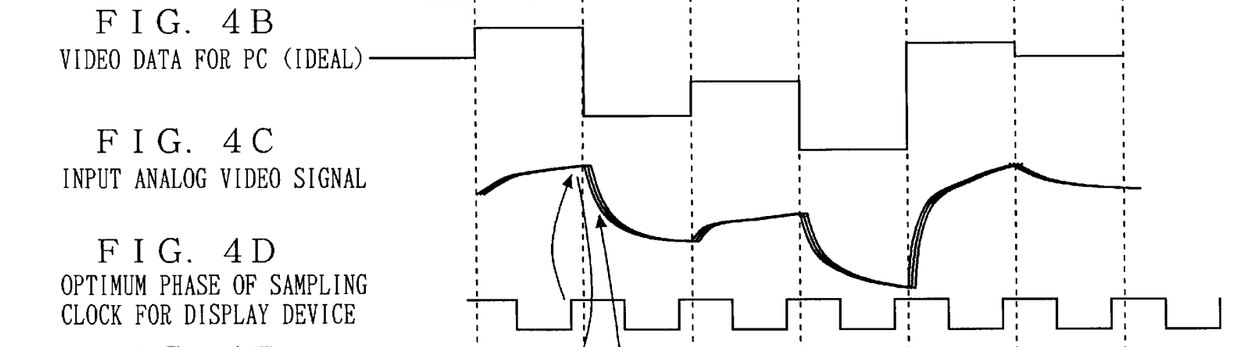
Figures 4E, 4F:
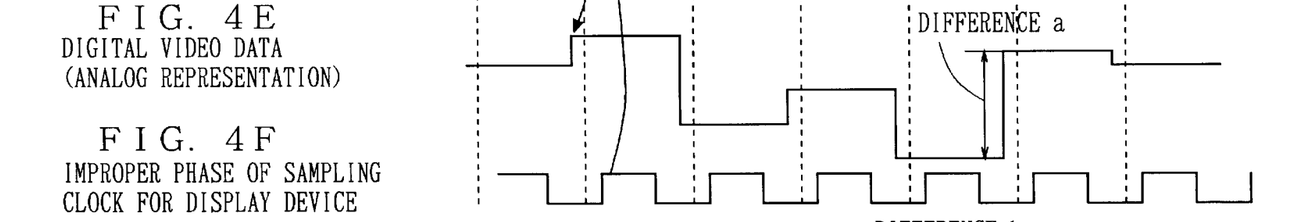
Figure 4G:
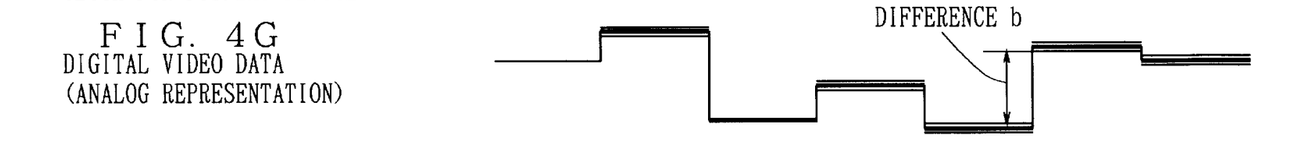

FIGS. 4A through 4G are a timing chart showing a phase relationship between the analog video signal V0 outputted from the PC 0 and the sampling clock signal CLK generated in the display device 100. FIG. 4A shows a sampling clock in the PC 0. FIG. 4B shows the analog video signal V0 in an ideal form outputted from the PC 0. FIG. 4C shows the analog video signal V0 having a waveform blurred due to the wiring capacitance between the PC 0 and the display device 100 and the like. FIG. 4D shows the optimum phase of the sampling clock signal CLK. FIG. 4E shows the digital video signal V2 into which the analog video signal V0 sampled using the sampling clock signal CLK of FIG. 4D is A-D converted. FIG. 4F is a phase of the sampling clock signal CLK being adjusted improperly. FIG. 4G shows the digital video signal V2 into which the analog video signal V0 sampled using the sampling clock signal CLK of FIG. 4F is A-D converted. The digital video signal V2 which is originally a signal indicating numerical data is shown in FIGS. 4E and 4G in analog signal waveform representation for purposes of illustration. The signals V0 and V2 are shown in FIGS. 4C and 4G using three overlapping lines and curves for purposes of illustrating the influence of jitter.

Figure 5:
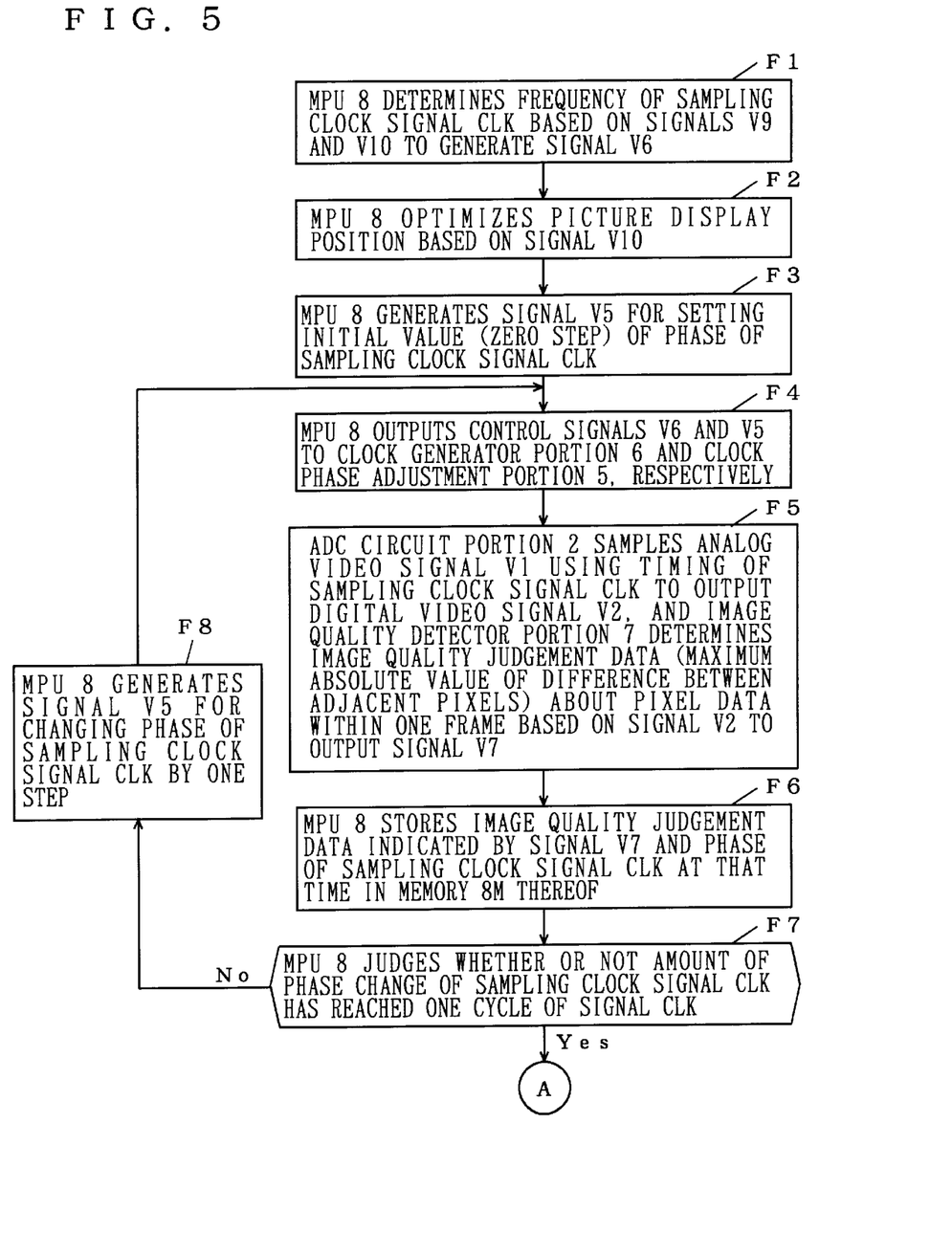
FIGS. 5 and 6 are functional diagrams showing the operation of the display device according to the present invention.
Figure 6:
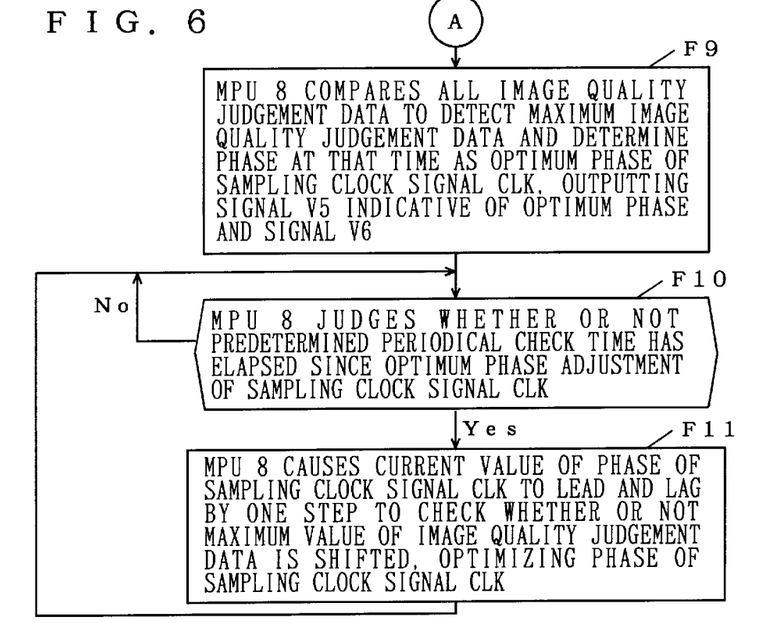

The operation of the device 100 of FIG. 1 will be discussed hereinafter with reference to FIGS. 5 and 6 as well as FIG. 1 for clarity. FIGS. 5 and 6 are functional diagrams showing in the form of functions an operation flow in the display device 100, mainly in the above-mentioned automatic image quality adjustment device.

Referring to FIG. 1 and the function Fl of FIG. 5, the MPU 8 initially determines the optimum frequency of the sampling clock signal CLK based on the signals V9 and V10 to generate the frequency control signal V6 which provides an instruction for the setting of the determined frequency.

The frequency of the sampling clock signal CLK0 is determined in a manner to be described below. Specifically, the MPU 8 determines the frequency from standard video signal timing data previously stored in the MPU 8, based on the frequency and polarity of the synchronizing signal VS indicated by the synchronizing signal judgement data signal V9 which are detected by the synchronizing signal detector portion 9 and on the data about the image start point and image end point indicated by the detection signal V10 which are detected by the image start and end detector portion 10. The standard video signal timing data contain timing commonly used in the PC 0. The standard values of the time periods designated by the reference characters a to f of FIG. 2 are specified by VESA (Video Electronics Standards Association). The memory 8M in the MPU 8 previously stores such data therein. The MPU 8 compares the above-mentioned data provided from the detector portions 9 and 10 with the timing data in the memory 8M to select the optimum frequency (sampling frequency) of the sampling clock signal CLK based on the data estimated to resemble each other most closely. To obtain this sampling frequency, the MPU 8 sets various parameters (a multiple of the clock CLK0 for the synchronizing signal VS, a filter constant which determines the speed of response of an internal generator, and the like) for use in the clock generator portion 6 to generate the frequency control signal V6 which provides the instruction for the setting conditions thereof.

Next, the MPU 8 optimizes a picture display position based on the signal V10 (picture position alignment function F2). This optimization is a precondition for the subsequent phase adjustment of the sampling clock signal CLK. More specifically, the image start point and image end point of one picture differ depending on the image being displayed. For example, when a black color is displayed on a right-hand half of the screen, the horizontal image end point is one-half that of a standard signal. Then, the MPU 8 infers a correct image end point b from analogy based on the detected data about the time periods a and c to f other than the time period b of FIG. 2 to generate information about the position of the correct image end point b as the signal V4, thereby outputting the signal V4 to the display portion 4.

Then, the MPU 8 generates the phase control signal V5 for providing an instruction for the setting of the phase for the phase adjustment of the sampling clock signal CLK0 in the clock phase adjustment portion 5. In this stage, the MPU 8 generates the instruction for setting the initial value of the phase of the sampling clock signal CLK, that is, for setting the sampling clock signal CLK0 with the step of phase change at zero function F3).

A circuit structure of the clock phase adjustment portion 5 will be described in connection with the setting of the phase control signal V5. The portion 5 comprises multiple transistor circuits controlled by the phase control signal V5. When the sampling clock signal CLK0 is applied to the multiple transistor circuits, the multiple transistor circuits provide output signals with slightly increasing time delays. Thus, the sampling clock signal CLK having an intended phase is determined depending on from which one of the transistor circuits the clock signal is extracted as the sampling clock signal CLK. Since the amount of time delay per transistor is determined by the type of transistors being used, the number of steps to be adjusted per cycle of the sampling clock signal CLK0 depends on the sampling clock frequency.

The amount of delay (predetermined amount of delay) for one step (for one transistor circuit) is determined herein so that one cycle of the sampling clock signal CLK corresponds to a phase change range comprised of 20 to 30 steps when the sampling frequency is maximum. The total number of steps is set so that the amount of phase change indicated by the total number of steps corresponds to one cycle of the sampling clock signal CLK0 even when the sampling frequency is minimum.

Since the amount of delay for one step and the total number of steps are previously set in this manner, the MPU 8 generates the phase control signal V5 for setting the phase of the sampling clock signal CLK to be fed to the ADC circuit portion 2 at the initial value, and subsequently generates the phase control signal V5 for sequentially changing the phase of the sampling clock signal CLK by the amount of delay for one step until the total number of steps is reached each time the MPU 8 receives the image quality judgment data for one frame.

Next, the MPU 8 outputs the generated frequency control signal V6 and phase control signal V5 to the clock generator portion 6 and the clock phase adjustment portion 5, respectively, to initiate the phase optimization of the sampling clock signal CLK (function F4).

Based on the horizontal synchronizing signal of the synchronizing signal (horizontal and vertical) VS, the clock generator portion 6 generates and outputs the sampling clock signal CLK0 synchronous with the synchronizing signal and having the sampling frequency and initial phase which are optimum for supply to the ADC circuit portion 2. The clock phase adjustment portion 5 receives the signals VS, V5 and CLK0 to generate and output the sampling clock signal CLK having the phase for which the phase control signal V5 gives an instruction.

The ADC circuit portion 2 receives the sampling clock signal CLK to sample and hold the analog video signal V1 on each rising edge of the signal CLK to generate and output the digital video signal V2 (function F5). The video data for one cycle of the sampling clock signal CLK serve as one-pixel data for one picture. The image on the screen in this case remains unchanged until the sampling clock phase adjustment is completed (until all of the functions F5 to F8 are completed). Therefore, the image on the screen indicated by the image data which is A-D converted in response to a new input of the sampling clock signal CLK after the sampling clock phase is changed is constantly the same as that before the phase change.

The image quality detector portion 7 receives the changed digital video signal V2 in sequential manner to detect the image quality judgement data about the pixel data within one frame (a picture provided by (b–a) to (d–e) of FIG. 2) to output the data as the image quality judgement data signal V7 to the MPU 8 (function F5). Specifically, the portion 7 determines the absolute value of the difference between the data about each pixel and its adjacent pixel to detect the maximum one of the absolute values. The portion 7 then stores the maximum value as the image quality judgement data for the one frame (the sampling clock phase) to output the image quality judgment data (See the difference a of the timing chart of FIG. 4E or the difference b of the timing chart of FIG. 4G). More specifically, the image quality detector portion 7 receives and stores data about an odd-numbered pixel in the register thereof. Then, the portion 7 receives data about the next even-numbered pixel to subtract the above-mentioned immediately preceding odd-numbered pixel data from the even-numbered pixel data (or may subtract the even-numbered pixel data from the odd-numbered pixel data), storing the absolute value of the difference therebetween in the register thereof. When receiving new data about the absolute value of the difference, the portion 7 compares the new data with the immediately preceding data about the absolute value of the difference which is stored in the register thereof. When the new data about the absolute value of the difference is greater, the portion 7 replaces the immediately preceding data about the absolute value of the difference stored in the register with the new data to store the new data in the register. The portion 7 continues such an operation for one frame to finally output the image quality judgement data at the sampling clock phase. Therefore, after the completion of the processing of one frame, the data about the maximum absolute value of the difference is stored in the portion 7.

Then, the MPU 8 receives the image quality judgment data (the data about the maximum absolute value of the difference) indicated by the output signal V7 to store the image quality judgment data and phase data (data about a phase step value) indicative of the sampling clock phase at that time in the memory 8M of the MPU 8 (function F6).

Next, the MPU 8 judges whether or not the amount of change in the sampling clock phase (the number of steps) has reached the phase change range corresponding to one cycle of the clock signal CLK (function F7). When the amount of change has not yet reached the phase change range, the MPU 8 sets the phase control signal VS for changing the sampling clock phase by one step for each frame (function F8). The MPU 8 outputs the signal V5 to the clock phase adjustment portion 5 so that the sampling clock phase is changed by one step. In response to the signal V5, the portion 5 provides a further one-step delay to the sampling clock signal CLK0 to generate and output the sampling clock signal CLK having a new sampling clock phase. The ADC circuit portion 2, the image quality detector portion 7 and the MPU 8 perform similar processing for the next frame. This allows the MPU 8 to obtain new image quality judgement data and the data about the sampling clock phase at that time for the next frame. When the amount of phase change reaches one cycle (about 360 degrees) of the sampling clock signal CLK, the MPU 8 holds a group of data including the image quality judgement data for the respective frames and the phase data associated with the respective image quality judgement data in the memory 8M thereof.

As described above, if the sampling clock phase is not optimum (the clock phase of FIG. 4F), the data about the absolute value of the difference are small since the image data are changing (See the timing chart of FIG. 4C).

After the course of the above-mentioned operations, the MPU 8 performs the function F9 for comparing the data about the absolute values of the differences for the respective frames with each other to determine a maximum one of the absolute values and determine the data about the sampling clock phase at that time (i.e., the number of steps indicating the amount of phase change at that time) as the optimum phase value of the sampling clock signal CLK, finally setting the signal V5 indicative of the data about the optimum phase value as optimum. This optimizes the phase of the sampling clock signal CLK to provide an image with optimized quality displayed on the screen of the display portion 14.

With the phase of the sampling clock signal CLK adjusted to its optimum value, a temperature increase in the elements of electric circuitry might in fact cause the sampling clock phase which has been optimum to become less than optimum.

To prevent such a difficulty, the display device 100 according to the present invention is adapted such that each time the timer 8T of the MPU 8 measures a predetermined length of periodical check time (e.g., tens of seconds), the MPU 8 causes the fixed sampling clock phase determined as optimum to lead and lag (in positive and negative directions) by one step to check whether or not a peak of the detected data is shifted, that is, whether or not the current sampling phase holds the optimum value. When the peak is shifted, the MPU 8 adjusts the sampling clock phase again within a range from the lagging phase to the leading phase. Such functions are the functions F10 and F11 of FIG. 6. This allows the sequential correction of changes in the sampling clock phase with time without the use of a temperature sensor if the optimum sampling clock phase is shifted due to temperatures and the like to result in the deterioration of image quality with time. In such a case, since the process of causing the sampling clock phase to lead and lag by one step requires time corresponding to only about three frames, the image quality being adjusted is not discernible with human eyes. This achieves very rapid real-time phase adjustment. This process is described in detail in accordance with the functions F11 and F11.

The MPU 8 judges whether or not the current time has reached the time at which the sampling clock phase is to be periodically checked, based on the time measured by the timer 8T provided therein (function F10). Upon judgement that the current time has reached the time for the periodical check, the MPU 8 performs a periodical phase correcting function which comprise processes (i) to (viii) to be described below (function F11).

(i) To confirm whether or not the current sampling clock phase holds its optimum value, the MPU 8 initially generates and outputs the phase control signal (referred to as a periodical-check phase control signal) V5 which provides an instruction for the number of steps of the current sampling clock phase to obtain the data about the maximum absolute value of the difference for a given frame from the image quality detector portion 7. The data is referred to herein as data A (periodical-check reference image quality judgement data).

(ii) Next, the MPU 8 outputs a first periodical-check phase control signal V5 for indicating the step value of the sampling clock phase immediately preceding the step value of the current sampling clock phase (the step value of the sampling clock phase which has been optimum) to the clock phase adjustment portion 5 to set the step value in the portion 5. The MPU 8 thereby obtains the data about the maximum absolute value of the difference for the given frame from the image quality detector portion 7. The data obtained is referred to as data B (first periodical-check image quality judgement data).

(iii) For the next frame, the MPU 8 outputs a second periodical-check phase control signal V5 for indicating the step value of the sampling clock phase immediately following the step value of the sampling clock phase which has been optimum to set the step value in the clock phase adjustment portion 5. The MPU 8 thereby obtains the data about the maximum absolute value of the difference for that frame from the image quality detector portion 7. The data obtained is referred to as data C (second periodical-check image quality judgement data).

(iv) The MPU 8 compares the data A, B and C thus obtained. If the data A is the greatest, the MPU 8 judges that the current sampling clock phase holds its optimum value.

(v) If the data B>the data A>the data C, the MPU 8 judges that the optimum point of the sampling clock phase has been shifted toward the data B to provide the step value of the sampling clock phase at the time that the data B is obtained to the clock phase adjustment portion 5.

(vi) If the data B>the data C>the data A, the MPU 8 judges that the current sampling clock phase is at its worst point to provide the step value of the sampling clock phase at the time that the data B or the data C is obtained to the clock phase adjustment portion 5.

(vii) If the data C>the data A>the data B, the MPU 8 judges that the optimum point of the sampling clock phase has been shifted toward the data C to provide the step value of the sampling clock phase at the time that the data C is obtained to the clock phase adjustment portion 5.

(viii) If the data C>the data B>the data A, the MPU 8 judges that the current sampling clock phase is at its worst point to provide the step value of the sampling clock phase at the time that the data B or the data C is obtained to the clock phase adjustment portion 5.

As described above, the MPU 8, at each periodical check time, changes the sampling clock phase by one step for each frame three times to compare the three data about the absolute values of the differences thus obtained with each other to check the sampling clock phase for a phase shift. Therefore, such processing requires time corresponding to only three frames.

(First Modification)

The above-mentioned process for detecting the image quality judgement data in the image quality detector portion 7 determines the data about the absolute values of the differences throughout the single frame and thereafter detects the maximum one of the absolute values. If the input video signal V0 contains noises, the influence of the noises increases the data about the absolute values of the differences, decreasing the reliability of the detected data.

An alternative to the above-mentioned detecting process may use the averages of all difference data within one frame as the image quality judgement data. This reduces the influence of the noises, but loses the advantage of the above-mentioned detecting process that a smaller memory area is required to store the difference data in the image quality detector portion 7.

Another modification may be employed which defines a particular region (e.g., a central square region including a 50 by 50 matrix of pixels) within one frame to calculate the average of the data about the absolute values of the differences in the particular region or to calculate the moving-average of the data about the absolute values of the differences within one frame in a predetermined range, thereby providing the image quality judgement data. This modification is not affected by the noises and requires a low memory capacitance.

It should be noted that the entire region within one frame or a particular region within one frame is generically referred to as a "predetermined area within one frame."

Alternatively, for reduction of the memory capacitance of the image quality detector portion 7, the image quality detector portion 7 may store about five to ten data about the absolute values of the differences which have decreasing magnitudes starting with the maximum data for one frame therein to use the average of these data as the image quality judgement data.

The use of the average of the data about the absolute values of the differences inevitably results in a lower value of the data about the absolute value of the difference than the use of the maximum of the data. Thus, this modification provides lower difference data detecting sensitivity for a display image (digital video data) which changes by a small amount than the method of the first preferred embodiment.

Conversely, the first preferred embodiment is advantageous in providing higher detecting sensitivity.

(Second Modification)

Figure 7:
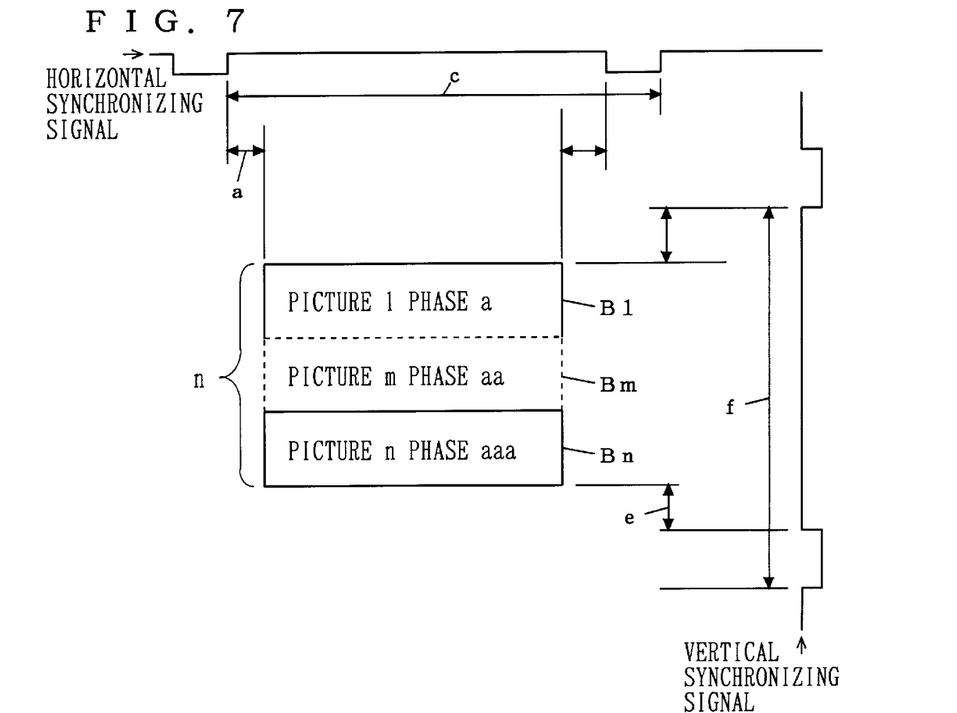
FIG. 7 shows timing and picture division according to a second modification of a first preferred embodiment of the present invention.
Figure 8:
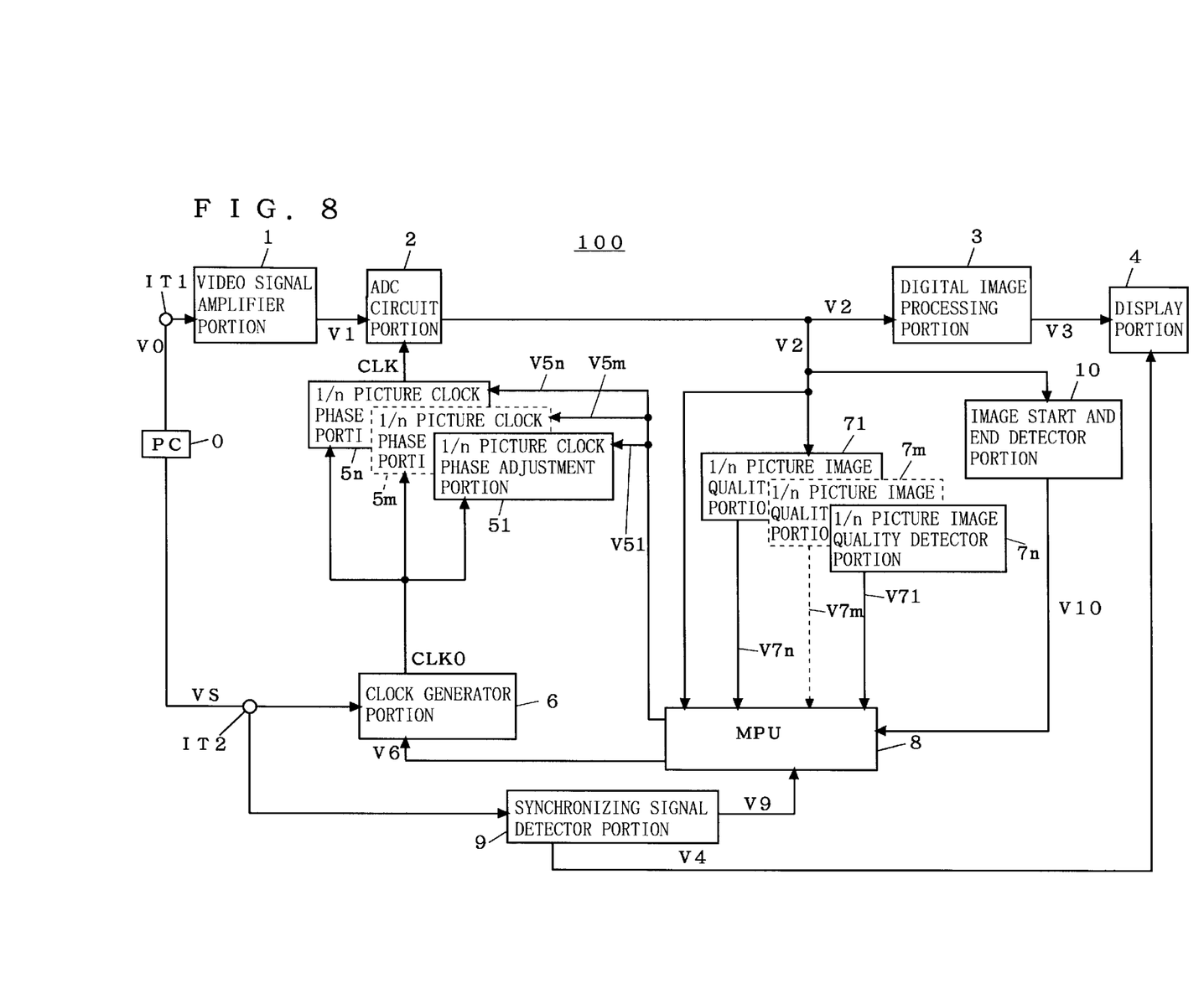
FIG. 8 is a block diagram of the second modification of the first preferred embodiment according to the present invention.

In the first preferred embodiment, the image quality judgement data are obtained, with the sampling clock phase changed for each frame. For increase in detection rate, a picture within one frame may be divided into several (n) blocks arranged in the vertical direction during only the phase detection with reference to FIG. 7, and image quality detector portions 71 to 7n and clock phase adjustment portions 51 to 5n may be provided respectively for the blocks Bm so that a different phase is set for each block Bm as shown in the block diagram of FIG. 8. Such a configuration of a display device 100A allows the processing of one-frame video data to provide the phase changes for several steps and a plurality of image quality judgement data for the phase changes at one time.

Thus, the second modification is adapted to divide one picture within one frame into n blocks for which the separate clock phase adjustment portions 51 to 5n are provided respectively so that the different number of steps for the sampling clock phase is set for each of the blocks Bm.

It is assumed, for example, that 30-step sampling clock phases are set in one cycle of the sampling clock signal CLK. In this case, when the sampling clock phase is changed by one step for each frame as in the first preferred embodiment, the processing time corresponding to 30 frames is required to obtain the image quality judgement data for all phases. On the other hand, when the process of dividing one frame into 3 blocks (n=3) is employed, the steps of a first sampling clock phase in each block are set in a manner to be described below. For the first block B1, the MPU 8 outputs a first phase control signal V51 which gives an instruction for setting the amount of 0-step phase change to the initial value of the sampling clock phase to the first clock phase adjustment portion 51 associated with the first block B1. For the second block B2 (where m shown in FIG. 7 equals 2), the MPU 8 outputs a second phase control signal V52 which gives an instruction for setting the amount of 10-step phase change to the second clock phase adjustment portion 52 (where m shown in FIG. 8 equals 2) associated with the second block B2. For the third block B3, the MPU 8 outputs a third phase control signal V53 which gives an instruction for setting the amount of 20-step phase change to the third clock phase adjustment portion 53 (where n shown in FIG. 8 equals 3) associated with the third block B3. Then, within a time period between the start point of one-frame video data and the end point of the first block B1, the first image quality detector portion 71 detects the maximum absolute value of the difference in the first block B1 as a first image quality judgement data signal V71, based on the digital video signal V2 sampled using the sampling clock signal CLK having the phase indicated by the initial value. Within a time period between the start point of the second block B2 and the end point thereof, the second image quality detector portion 72 detects the maximum absolute value of the difference between adjacent pixels in the second block B2 as a second image quality judgment data signal V72, based on the digital video signal V2 sampled using the sampling clock signal CLK having a phase changed by 10 steps from the initial value.

Within a time period between the start point of the third block B3 and the end point thereof, the third image quality detector portion 73 detects the maximum absolute value of the difference in the third block B3 as a third image quality judgement data signal V73, based on the digital video signal V2 sampled using the sampling clock signal CLK having a phase changed by 20 steps from the initial value. Thus, upon completion of processing for one frame, the MPU 8 may obtain three image quality judgement data at one time. For the next frame, the above-mentioned processing is repeated, with the number of steps indicative of the amount of change in sampling clock phase for the blocks B1 to B3 set respectively at 1, 11 and 21. Such an arrangement allows the MPU 8 to obtain the image quality judgement data for the steps of all phases upon completion of the processing for ten frames, thereby to complete the process of obtaining the image quality judgement data required for determining the optimum sampling clock phase at a speed three times higher than that of the first preferred embodiment.

The first modification may be applied to the second modification.

(Third Modification)

A third modification is applicable to the first preferred embodiment and the first and second modifications thereof.

In accordance with the above description, the sampling clock frequency is determined by the standard image signal timing data previously stored in the MPU 8, based on the data detected about the frequency and polarity of the synchronizing signal by the synchronizing signal detector portion 9 and the data detected by the image start and end detector portion 10.

However, the MPU 8 is capable of determining the sampling frequency without using the detection signals V9 and V10 and the standard video signal timing data. Specifically, if the sampling frequency is not optimum, the comparison data immediately preceding and following the difference data are increased or decreased with changes in sampling clock phase. The cycle of this fluctuation depends on the amount of shift of the sampling frequency from its optimum value. Then, the MPU 8 sets the sampling frequency at a suitable initial value and also sets the initial value of the sampling clock phase to output the set sampling frequency as a first temporary frequency control signal and the set sampling clock phase as a temporary phase control signal to the portions 6 and 5, respectively. The MPU 8 observes changes in amplitude of the difference data for one horizontal line obtained from the digital video signal V2 consequently outputted from the ADC circuit portion 2 to store the cycle of the difference data (first cycle data). Next, the MPU 8 substantially changes the sampling frequency by one step to output the value as a second temporary frequency control signal to the clock generator portion 6. The MPU 8 compares the cycle (second cycle data) at that time with the preceding cycle. If the cycle (second cycle data) at that time is greater than the preceding cycle, the MPU 8 further changes the sampling frequency by one step. If the cycle is less than the preceding cycle, the MPU 8 changes the sampling frequency so that the change in the sampling frequency decreases. The MPU 8 may sequentially repeats such processing to detect the absence of the cycle of change in the amplitude of the difference data, thereby determining the sampling frequency in the absence of the cycle of change as its optimum value. This determination may fix the value of the frequency control signal V6 of FIG. 1.

While the invention has been described in detail, the foregoing description is in all aspects illustrative and not restrictive. It is understood that numerous other modifications and variations can be devised without departing from the scope of the invention.

I claim:

1. A device for automatically adjusting image quality, comprising:

(a) frequency optimizing means for generating a frequency control signal for setting a frequency of a sampling clock signal synchronous with a synchronizing signal provided from the exterior;

(b) phase optimizing means for generating a phase control signal for setting a phase of said sampling clock signal;

(c) clock producing means receiving said synchronizing signal, said frequency control signal and said phase control signal for generating said sampling clock signal having said frequency determined by said frequency control signal and said phase determined by said phase control signal and synchronous with said synchronizing signal;

(d) converting means receiving an analog video signal and said sampling clock signal for sampling and holding said analog video signal using timing of said sampling clock signal to convert said analog video signal into a digital video signal;

(e) image quality detecting means receiving said digital video signal for detecting the quality of one picture indicated by said digital video signal to generate an image quality judgement data signal; and (f) storing means for storing said image quality judgement data signal outputted from said image quality detecting means and phase data indicative of said phase of said sampling clock signal associated with said image quality judgement data signal, said phase optimizing means comprising (b-1) phase control signal changing means for sequentially changing said phase indicated by said phase control signal by a predetermined amount of phase change from its initial value within a phase change range corresponding to one cycle of said sampling clock signal each time said storing means stores said image quality judgement data signal for said one picture and said phase data associated therewith, and (b-2) optimum phase determining means for extracting a maximum one of a group of data containing said image quality judgement data signal for said one picture stored in said storing means before the amount of change in said phase of said sampling clock signal reaches said phase change range to determine said phase of said sampling clock signal associated with said maximum one as an optimum phase and to finally determine an optimum phase control signal indicative of said optimum phase as said phase control signal.

2. The device according to claim 1, wherein said image quality detecting means generates said image quality judgement data signal, based on data about the absolute value of a difference between data about adjacent pixels in said one picture.

3. The device according to claim 2, wherein said image quality detecting means determines a data signal indicative of a maximum one of the data about the absolute value of the difference over the entire area of said one picture as said image quality judgement data signal.

4. The device according to claim 2, wherein said image quality detecting means detects an average of all of said data about the absolute value of the difference within a predetermined area in said one picture to determine a data signal indicative of said average as said image quality judgement data signal.

5. The device according to claim 4, wherein said predetermined area in said one picture corresponds to the entire area of said one picture.

6. The device according to claim 2, wherein said image quality detecting means detects a moving-average of all of said data about the absolute value of the difference within a predetermined area in said one picture to determine a data signal indicative of said moving-average as said image quality judgement data signal.

7. The device according to claim 2, wherein said image quality detecting means determines as said image quality judgement data signal a data signal indicative of an average of some selected data which have decreasing magnitudes starting with the greatest among said data about the absolute value of the difference over the entire area of said one picture.

8. The device according to claim 2, wherein said frequency optimizing means comprises:

(a-1) synchronizing signal detecting means receiving said synchronizing signal for detecting a frequency and a polarity of said synchronizing signal to output a detection result as a synchronizing signal judgement data signal;

(a-2) image start and end detecting means receiving said digital video signal for detecting a start point and an end point in displaying digital video data for said one picture indicated by said digital video signal to output a detection result as an image start and end judgement data signal;

(a-3) timing data storing means for storing standard video signal timing data therein; and (a-4) frequency control signal generating means for determining said frequency of said sampling clock signal from said standard video signal timing data read from said timing data storing means, based on said synchronizing signal judgement data signal and said image start and end judgment data signal, to output a signal which gives an instruction for a determined frequency as said frequency control signal.

9. The device according to claim 2, wherein said frequency optimizing means comprises:

(a-1) means for setting a suitable initial value to said frequency of said sampling clock signal to output a first temporary frequency control signal which gives an instruction for said suitable initial value to said clock producing means;

(a-2) means for outputting a temporary phase control signal which gives an instruction for the initial value of said phase of said sampling clock signal to said clock producing means; and (a-3) means receiving said digital video signal outputted form said converting means in response to said first temporary frequency control signal outputted from said means (a-1) and said temporary phase control signal outputted from said means (a-2) for detecting a change in amplitude of difference data for one horizontal line in a digital image indicated by said digital video signal to store first cycle data about the amplitude change, said means (a-3) then changing said suitable initial value set by said means (a-1) by a predetermined value to output a second temporary frequency control signal indicative of a new value resulting from the change to store second cycle data about the amplitude change of the difference data for said one horizontal line obtained at that time, said means (a-3) making a comparison between said first cycle data and said second cycle data to further change said new value by a value determined depending on a result of the comparison, said means (a-3) continuing sequentially changing the value of said frequency of said sampling clock signal until the cycle of the amplitude change of the difference data for said one horizontal line is absent, said means (a-3) determining a value of said frequency of said sampling clock signal in the absence of said cycle as an optimum value to finally generating a signal indicative of said optimum value as said frequency control signal.

10. The device according to claim 1, further comprising:

(g) timer means for judging whether or not a predetermined time for periodical check has been elapsed since the determination of said optimum phase; and (h) periodical phase correction means for generating and outputting first and second periodical check phase control signals as said phase control signal to read from said storing means said image quality judgment data signal consequently outputted from said image quality detecting means to determine a new optimum phase based on a read image quality judgement data signal when said timer means judges that said predetermined time for periodical check has been elapsed, said first and second periodical check phase control signals indicating phases changed from said optimum phase by said predetermined amount of phase change in positive and negative directions, respectively.

11. The device according to claim 1, wherein, when said one picture is divided into a plurality of blocks, said phase control signal changing means comprises (b-1-1) means provided for a respective associated one of said plurality of blocks, said means for sequentially generating and outputting said phase control signal which gives an instruction so that the associated block differs in said initial value from other blocks to sequentially change said phase for the associated block indicated by said phase control signal by said predetermined amount of phase change from said initial value for the associated block, wherein the sum of the amounts of phase change for said plurality of blocks corresponds to said phase change range, and wherein said image quality detecting means detects the image quality for each of said plurality of blocks for said one picture to generate and output a detection result as said image quality judgement data signal.

12. A display device comprising:

the device for automatically adjusting image quality as recited in claim 1; and a display portion for displaying a digital image indicated by said digital video signal outputted from said converting means which converts said analog video signal thereto based on said sampling clock signal having said optimum phase.

13. An automatic image quality adjustment device, comprising:

a first input signal line receiving an analog video signal provided from the exterior;

a second input signal line receiving a synchronizing signal provided from the exterior;

a frequency optimization circuit portion configured to generate a frequency control signal for setting a frequency of a sampling clock signal synchronous with said synchronizing signal;

a phase optimization circuit portion configured to generate a phase control signal for setting a phase of said sampling clock signal;

a clock production circuit portion connected to said second input signal line, an output of said frequency optimization circuit portion and an output of said phase optimization circuit portion for generating said sampling clock signal having said frequency determined by said frequency control signal and said phase determined by said phase control signal and synchronous with said synchronizing signal;

an analog-digital conversion circuit portion connected to said first input signal line and an output of said clock production circuit portion for sampling and holding said analog video signal using timing of said sampling clock signal to convert said analog video signal into a digital video signal;

an image quality detection portion connected to an output of said analog-digital conversion circuit portion and configured to detect the quality of one picture indicated by said digital video signal to generate an image quality judgement data signal; and a storage portion configured to store said image quality judgement data signal outputted from said image quality detection portion and phase data indicative of said phase of said sampling clock signal associated with said image quality judgement data signal, said phase optimization circuit portion comprising a phase control signal change portion configured to sequentially change said phase indicated by said phase control signal by a predetermined amount of phase change from its initial value within a phase change range corresponding to one cycle of said sampling clock signal each time said storage portion stores said image quality judgement data signal for said one picture and said phase data associated therewith, and an optimum phase determination portion configured to extract a maximum one of a group of data containing said image quality judgement data signal for said one picture stored in said storage portion before the amount of change in said phase of said sampling clock signal reaches said phase change range to determine said phase of said sampling clock signal associated with said maximum one as an optimum phase and to finally determine an optimum phase control signal indicative of said optimum phase as said phase control signal.

14. The device according to claim 13, further comprising:

a timer configured to judge whether or not a predetermined time for periodical check has been elapsed since the determination of said optimum phase; and a periodical phase correction portion configured to generate and output first and second periodical check phase control signals as said phase control signal to read from said storage portion said image quality judgment data signal consequently outputted from said image quality detection portion to determine a new optimum phase based on a read image quality judgement data signal when said timer judges that said predetermined time for periodical check has been elapsed, said first and second periodical check phase control signals indicating phases changed from said optimum phase by said predetermined amount of phase change in positive and negative directions, respectively.

15. The device according to claim 13, wherein, when said one picture is divided into a plurality of blocks, said phase control signal change portion comprises a circuit portion configured for a respective associated one of said plurality of blocks, said circuit portion sequentially generating and outputting said phase control signal which gives an instruction so that the associated block differs in said initial value from other blocks to sequentially change said phase for the associated block indicated by said phase control signal by said predetermined amount of phase change from said initial value for the associated block, wherein the sum of the amounts of phase change for said plurality of blocks corresponds to said phase change range, and wherein said image quality detection portion detects the image quality for each of said plurality of blocks for said one picture to generate and output a detection result as said image quality judgement data signal.

* * * * *